US012522003B2

(12) United States Patent
Saiki

(10) Patent No.: US 12,522,003 B2
(45) Date of Patent: Jan. 13, 2026

(54) RECORDING APPARATUS

(71) Applicant: CANON KABUSHIKI KAISHA, Tokyo (JP)

(72) Inventor: Waichiro Saiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 18/440,186

(22) Filed: Feb. 13, 2024

(65) Prior Publication Data

US 2024/0269995 A1 Aug. 15, 2024

(30) Foreign Application Priority Data

Feb. 15, 2023 (JP) ................................ 2023-021370

(51) Int. Cl.
*B41J 11/00* (2006.01)
*B41J 11/06* (2006.01)
*B41J 15/04* (2006.01)

(52) U.S. Cl.
CPC ...... *B41J 11/00224* (2021.01); *B41J 11/0005* (2013.01); *B41J 11/06* (2013.01); *B41J 15/046* (2013.01)

(58) Field of Classification Search
CPC ... B41J 11/00224; B41J 11/0005; B41J 11/06; B41J 15/046; B41J 11/0085
See application file for complete search history.

(56) References Cited

U.S. PATENT DOCUMENTS 6,367,906 B1 * 4/2002 Hiramatsu ................ B41J 2/04 347/34
9,987,858 B2 6/2018 Perez Gellida et al.
2016/0129712 A1 5/2016 Yoshinaga et al.

* cited by examiner

*Primary Examiner* — Bradley W Thies
(74) *Attorney, Agent, or Firm* — Venable LLP

(57) ABSTRACT

A recording apparatus includes a conveying unit configured to convey a recording medium in a conveyance direction, a platen configured to support the recording medium conveyed by the conveying unit, a recording head configured to perform recording on the recording medium supported by the platen, a pressing unit configured to press the recording medium upstream of the platen in the conveyance direction, an air blowing unit configured to blow air toward a supported region of the recording medium, which is supported by the platen, from an upstream side in the conveyance direction, and a guide member configured to be fixed to the pressing unit, provide partitioning between a space facing a blown air outlet of the air blowing unit and the pressing unit, and guide the air blown by the air blowing unit.

20 Claims, 6 Drawing Sheets

RECORDING APPARATUS

BACKGROUND OF THE INVENTION

Field of the Invention

The present invention relates to a recording apparatus that dries a recording liquid on a recording medium.

Description of the Related Art

It is desirable that a liquid-ejection recording apparatus represented by an ink-jet recording apparatus has an ability to print a high-quality image onto a recording medium even when a surrounding environment is a low-temperature or high-temperature environment. However, in a case of, e.g., the low-temperature environment, a so-called aqueous ink based on water and serving as a recording liquid does not easily dry on a recording medium to which the aqueous ink has been ejected, which may adversely affect a printing quality. In recent years, as a solution to such a printing quality problem, it has been proposed to mount a printing zone blowing mechanism for drying ink on a recording medium (U.S. Pat. No. 9,987,858). By blowing air to the recording medium, the printing zone blowing mechanism can accelerate drying of the ink immediately after the ink has been ejected onto the recording medium. This can suppress deterioration of a printing quality.

SUMMARY OF THE INVENTION

However, between a printing region and an air blowing nozzle, a component such as a pinch roller is mounted and, when a surface of such a component has unevenness or a hole, blown air may be disturbed thereby resulting in disturbed uniformity of the blown air. When the uniformity of the blown air is disturbed, drying conditions of the recording medium may be different from one place to another, resulting in a concern that uneven drying occurs to deteriorate the image quality.

An object of the present invention is to provide a technology that allows a recording liquid to be uniformly dried on a recording medium.

To attain the object described above, a recording apparatus of the present invention includes:

- a conveying unit configured to convey a recording medium in a conveyance direction;
- a platen configured to support the recording medium conveyed by the conveying unit;
- a recording head configured to perform recording on the recording medium supported by the platen;
- a pressing unit configured to press the recording medium upstream of the platen in the conveyance direction;
- an air blowing unit configured to blow air toward a supported region of the recording medium, which is supported by the platen, from an upstream side in the conveyance direction; and
- a guide member configured to be fixed to the pressing unit, provide partitioning between a space facing a blown air outlet of the air blowing unit and the pressing unit, and guide the air blown by the air blowing unit.

According to the present invention, it is possible to uniformly dry a recording liquid on a recording medium.

Further features of the present invention will become apparent from the following description of exemplary embodiments with reference to the attached drawings.

DESCRIPTION OF THE EMBODIMENTS

Figure 1:
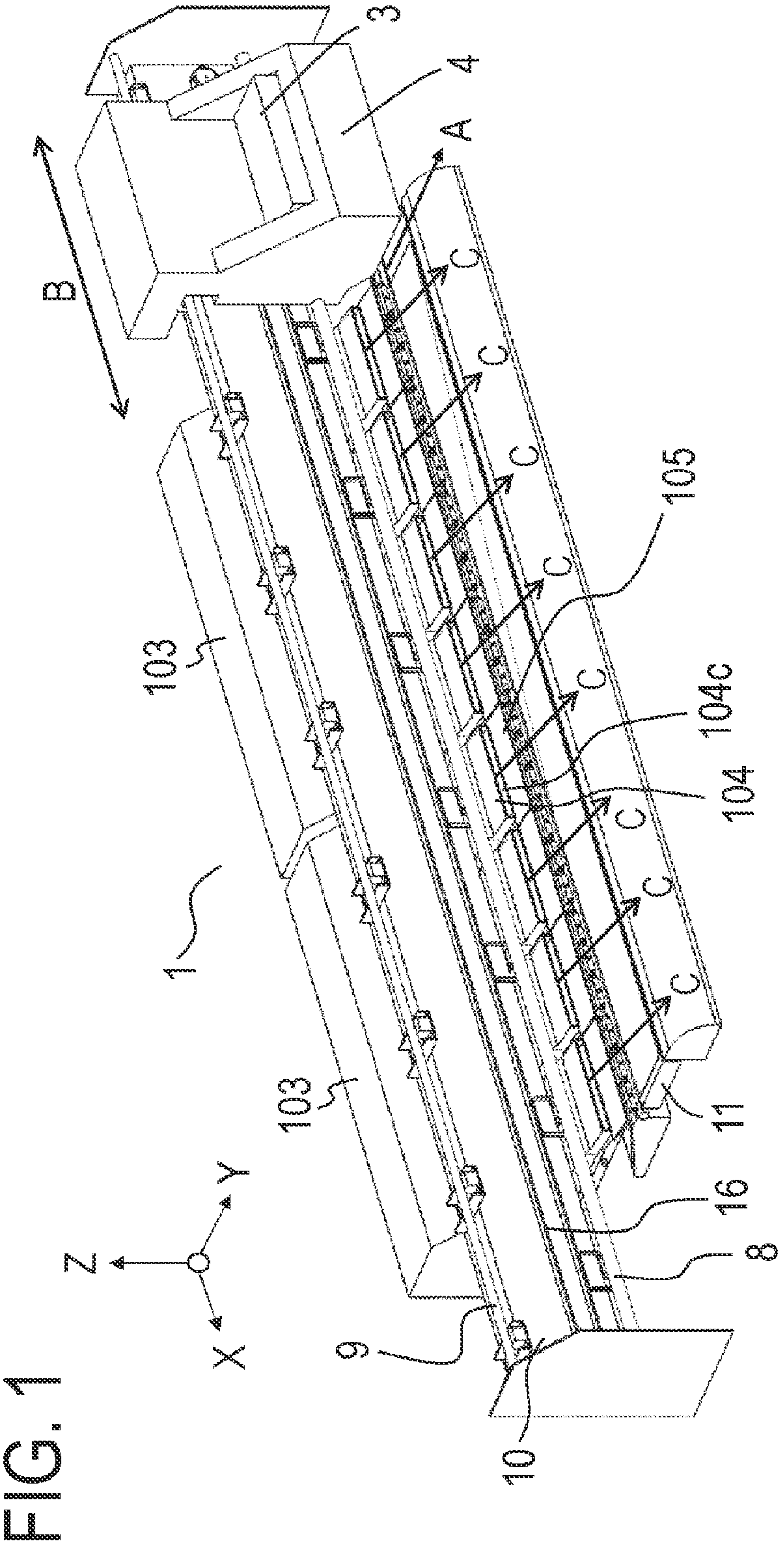
FIG. 1 is a perspective view of a recording apparatus in a first embodiment of the present invention.

Referring to the drawings, modes for carrying out this invention will be described below in detail by way of example on the basis of each of example embodiments. Note that dimensions, materials, shapes, relative positioning, and the like of components described in the embodiment are to be appropriately changed depending on a configuration of an apparatus to which the present invention is applied and various conditions. In other words, it is not intended to limit the scope of this invention to the following embodiments.

First Embodiment

Figure 2:
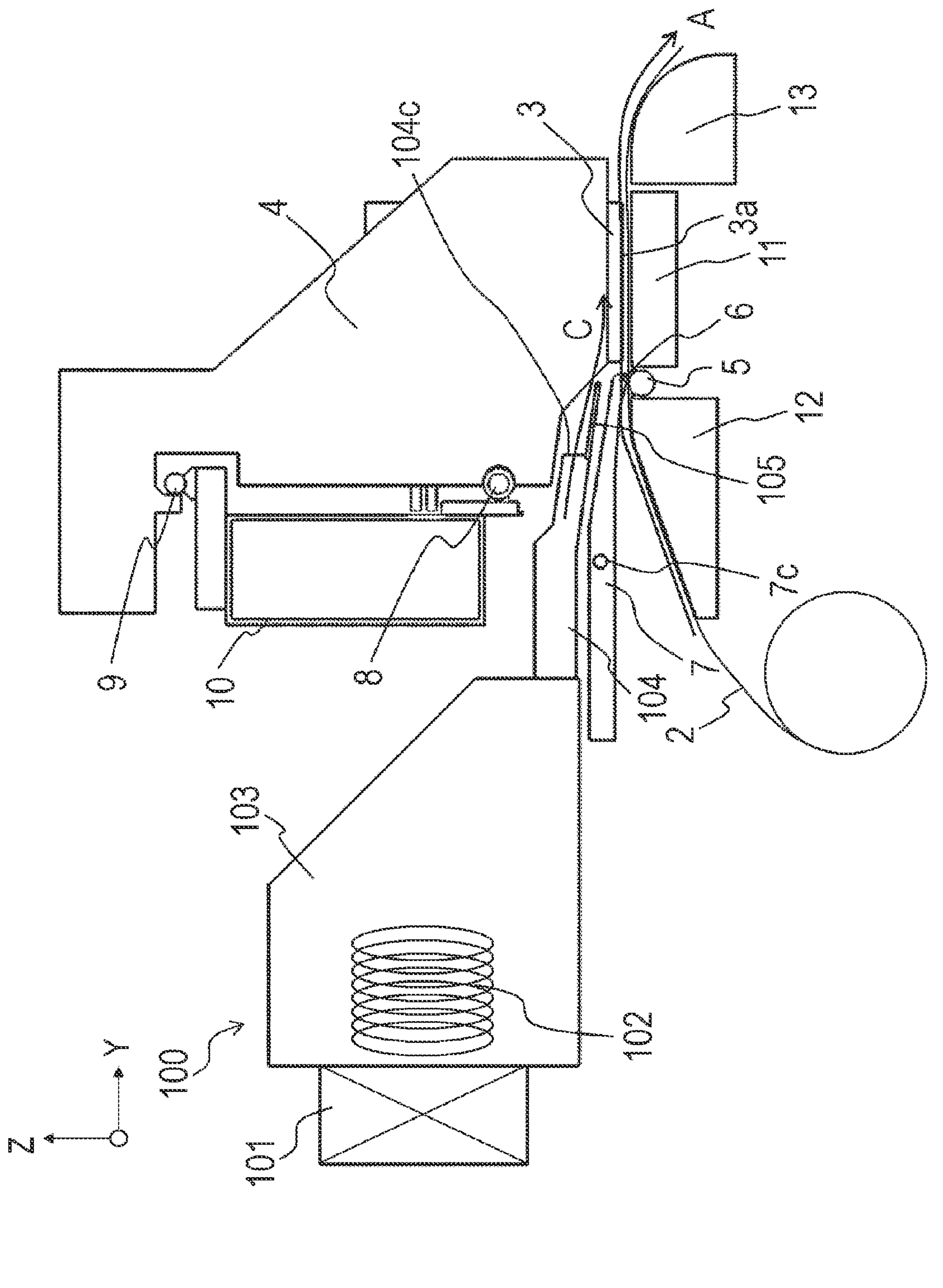
FIG. 2 is a cross-sectional view of the recording apparatus in the first embodiment of the present invention.

Referring to FIGS. 1 and 2, a description will be given of an outline of an entire recording apparatus according to the first embodiment of the present invention. A description will be given herein of a liquid-ejection recording apparatus (ink-jet recording apparatus) that ejects ink serving as a recording liquid to a recording medium to record an image or the like on the recording medium as an example of a recording apparatus 1 according to the first embodiment of the present invention.

FIG. 1 is a schematic perspective view illustrating a general configuration around a recording unit in the recording apparatus according to the present embodiment. FIG. 2 is a schematic cross-sectional view of FIG. 1 along directions (a Y-direction and a Z-direction) perpendicular to an X-direction parallel to a main scanning direction in a recording operation. First, a description will be given of configurations common to all the embodiments.

Note that, as described above, in each of the drawings including and subsequent to FIGS. 1, 2, and 3A to 3C, the X-direction is a direction along the main scanning direction (reciprocating direction of a recording head) in the recording operation, which is a width direction of the recording medium. Meanwhile, the Y-direction is a conveyance direction of the recording medium, i.e., a direction along a sub-scanning direction. Furthermore, the Z-direction is a direction along a vertical direction (gravity direction), which is a direction perpendicular to a recorded surface of the recording medium. A location of the recording apparatus 1 in each of the drawings assumes, as a normal use state of the apparatus, a state where the recording apparatus 1 is placed on a placement surface horizontal to the vertical direction.

As illustrated in FIGS. 1 and 2, in the recording apparatus 1, a roll-shaped recording medium (rolled sheet) 2 is mounted. The recording medium 2 is fed onto an upstream platen 12 by a feeding unit (not shown), and is then held by a conveying roller 5 and a pinch roller (roller) 6 which serve as a pair of conveying members included in a conveying unit. The pinch roller 6 receives, as each of the conveying member and a pressing member, a biasing force of a spring (not shown) and thereby presses the recording medium 2 in a direction of the conveying roller 5 to hold the recording medium 2.

From a viewpoint of moldability, it is difficult to produce the pinch roller 6 as a single member of a size corresponding to a width of the recording medium 2 along the main scanning direction, and accordingly a configuration is used in which the pinch roller 6 is divided into a plurality of pieces to be arranged in the main scanning direction. In other words, a plurality of the pinch rollers 6 each serving as the pressing member is provided so as to be aligned in the main scanning direction, and the individual pinch rollers 6 are supported by pinch roller holders 7 to be rotatable around a rotation axis line along the main scanning direction. Correspondingly to the pinch rollers 6, the plurality of pinch roller holders 7 each serving as a supporting member is also provided so as to be aligned in the main scanning direction. Consequently, between the plurality of pinch rollers 6 and the plurality of pinch roller holders 7, which are aligned side by side in the main scanning direction, a gap in the main scanning direction is formed.

Each of the pinch roller holders 7 is provided so as to extend from an upstream side in the conveyance direction of the recording medium 2 toward a recording region where a recording head 3 and the recording medium 2 supported by a platen 11 face each other, while rotatably supporting the pinch roller 6 on a leading end side thereof. The pinch roller holder 7 has a rotation shaft 7*c* along the main scanning direction on the upstream side of a part thereof supporting the pinch roller 6 in the conveyance direction of the recording medium 2, and is configured to be swingable around the rotation shaft 7*c*. By the swing around the rotation shaft 7*c*, the pinch roller holder 7 is allowed to perform an operation of bringing the pinch roller 6 into contact with and away from the conveying roller 5.

The conveying roller 5 rotates in a state where the recording medium 2 is held between the conveying roller 5 and each of the pinch rollers 6, and consequently the recording medium 2 is conveyed onto the platen 11 by a frictional force generated in a holding portion between the conveying roller 5 and the pinch roller 6 (direction of an arrow A). Note that the recording medium 2 is conveyed by being held between the conveying roller 5 and the pinch roller 6, and therefore it is necessary for a length (length in a direction crossing the conveyance direction) in the width direction (X-direction) of the recording medium 2 to be equal to or less than a width of the conveying roller 5 and the pinch roller 6.

Above the platen 11, the recording head 3 and a carriage 4 holding the recording head 3 are provided. The carriage 4 is supported by a frame 10, a main rail 8, and a sub-rail 9 each provided to extend in the X-direction. The carriage 4 is also connected to a carriage motor 21 (see FIG. 6) via a belt 16. As a result of rotation of the carriage motor 21 in a normal rotation direction and a reverse rotation direction, the carriage 4 is pulled by the belt 16 connected thereto to reciprocate over the platen 11 along the main rail 8 serving as a guide rail (direction of an arrow B).

On the recording medium 2 conveyed onto the platen 11, recording is performed with ink ejected from a row of ejection ports formed in an ejection port surface 3*a* of the recording head 3 mounted on the carriage 4 in a process in which the carriage 4 reciprocates over the recording medium 2. When the recording is performed, to the recording medium 2 conveyed onto the platen 11, air is supplied from an air blowing unit 100 serving as an air blowing unit to accelerate drying of the ink recorded on the recording medium 2.

The air blowing unit 100 is configured to include an air blowing fan 101, blown air ducts 103, air blowing nozzles 104, and blown air guide plates 105. Blown air generated by the air blowing fan 101 serving as a blown air source passes through an air path formed of the blown air ducts 103 and the air blowing nozzles 104 connected to the blown air ducts 103 each serving as an air path member. With such a configuration, the air blowing unit 100 supplies the air to the recording medium 2 (recording region) (an arrow C). In a case of further accelerating the drying of the ink, a heater 102 is provided downstream of the air blowing fan 101 to be able to apply heat to the air supplied from the air blowing fan 101 and change the air to be supplied to the recording medium 2 to warm air.

The air blowing nozzles 104 are provided above each of the pinch roller holders 7 and the upstream platen 12 each serving as the supporting member for the pinch rollers 6 and below each of the main rail 8 and the frame 10. Air exhaust ports (blown air outlets) 104*c* of the air blowing nozzles 104 are disposed to be on a downstream side of the main rail 8 and on an upstream side of each of the conveying roller 5 and the pinch rollers 6 in the conveyance direction (an arrow A direction or the Y-direction) of the recording medium 2. In addition, to blow the air mainly to a part (see a supported region 2*a* in FIG. 3A or the like) of the recording medium 2 which is supported by the platen 11, each of the air blowing nozzles 104 is provided in a more downward shape with downstream advance in the conveyance direction. As a result, a direction of the air flowing out of the blown air outlet 104*c* is configured to face the conveyance direction of the recording medium 2 supported by the platen 11.

As illustrated in FIG. 1, the plurality of air blowing nozzles 104 is equidistantly arranged along a reciprocation direction (an arrow B direction or the X-direction) of the recording head 3 (carriage 4). Depending on a reciprocating position of the recording head 3, some of the plurality of air blowing nozzles 104 face the recording head 3 (carriage 4) in the conveyance direction A (Y-direction) of the recording medium 2.

The recording medium 2 having gone through recording and air blow drying as described above is further conveyed by the conveying roller 5 and discharged to the outside of the apparatus over a downstream platen 13.

Figure 6:
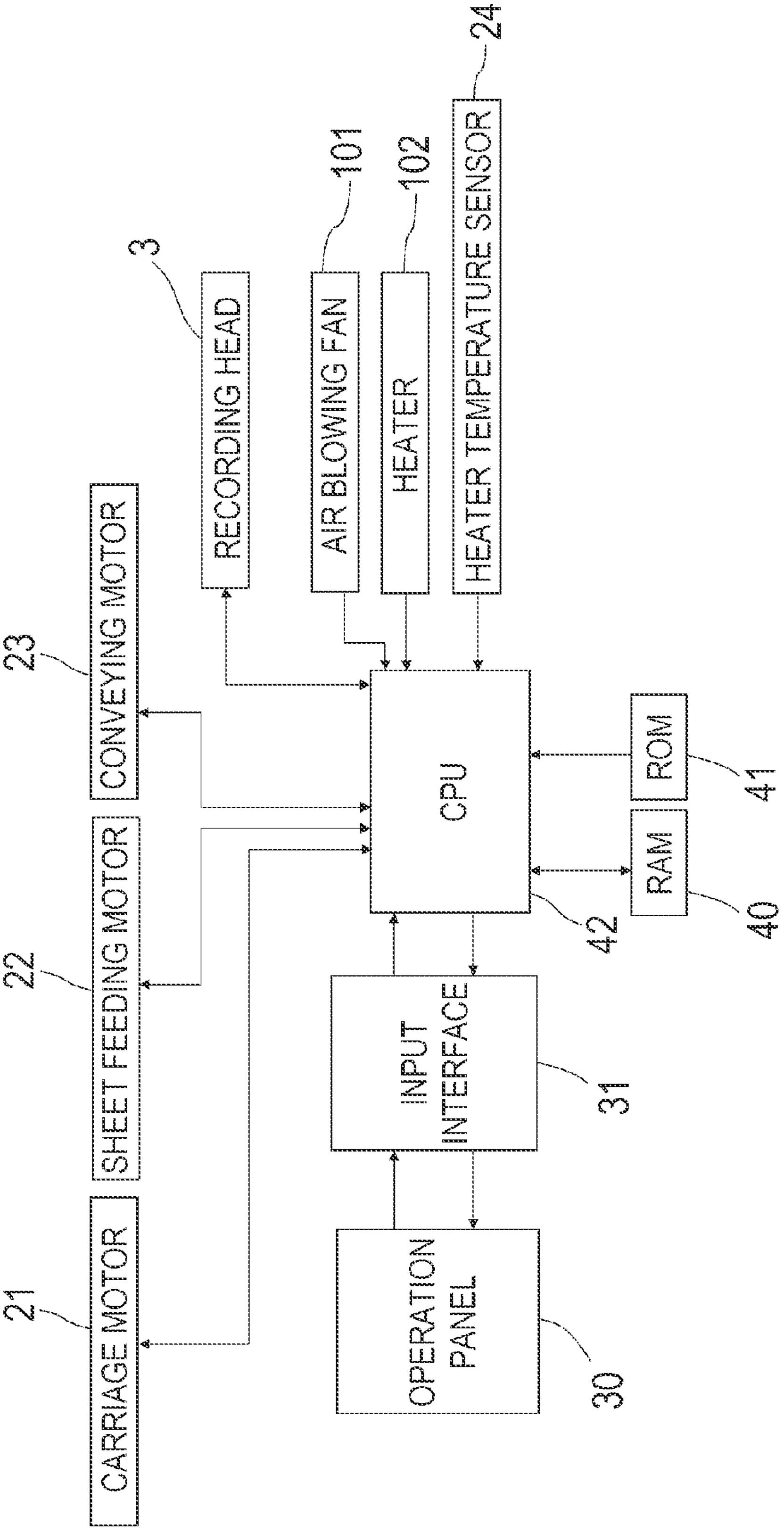
FIG. 6 is a block diagram illustrating a control configuration of the recording apparatus.

FIG. 6 is a block diagram for illustrating an example of a configuration of a control system in the recording apparatus 1. A CPU 42 controls, according to a control program stored in a ROM 41, each part of the recording apparatus 1 including the carriage motor 21, a sheet feeding motor 22, and a conveying motor 23. To the CPU 42, various setting information such as a type and a width of the recording medium 2 and a set temperature of the heater 102 or the like is input from an operation panel 30 via an input interface 31. The CPU 42 also writes and reads information related to the recording medium 2 or the like to and from a RAM 40. The carriage motor 21, the sheet feeding motor 22, the conveying motor 23, the recording head 3, the air blowing fan 101, and the heater 102 are output-controlled by the CPU 42 on the basis of a temperature detected by a heater temperature sensor 24 or a prescribed value written on the ROM 41. In other words, scanning by the carriage 4, conveyance of the recording medium 2, driving of the heater 102 and blowing by the air blowing fan 101 are controlled.

Figure 3A:
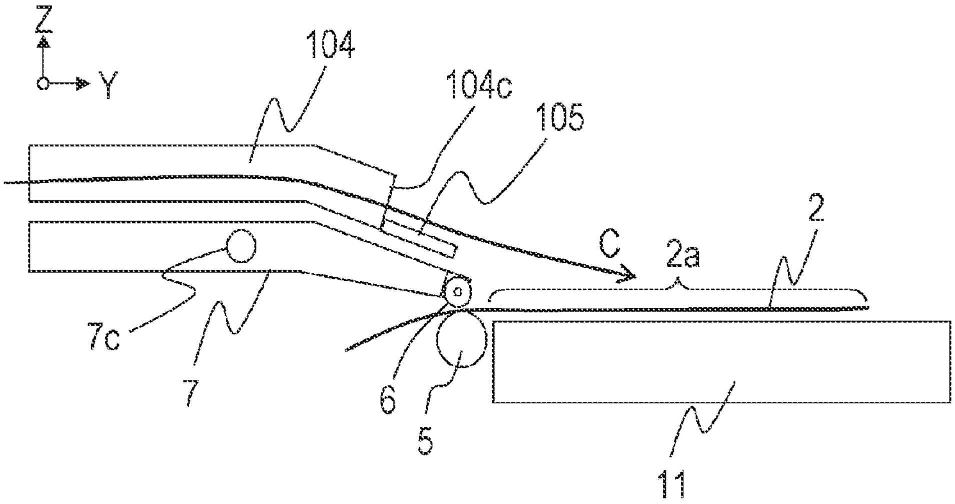
FIGS. 3A to 3C are illustrative views of a configuration around air blowing nozzles of the recording apparatus in the first embodiment of the present invention.
Figure 3B:
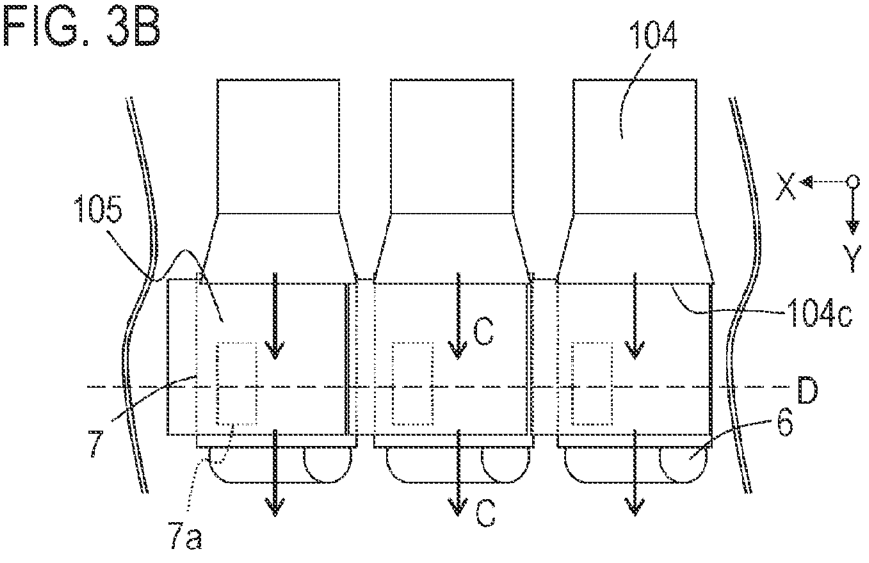
Figure 3C:
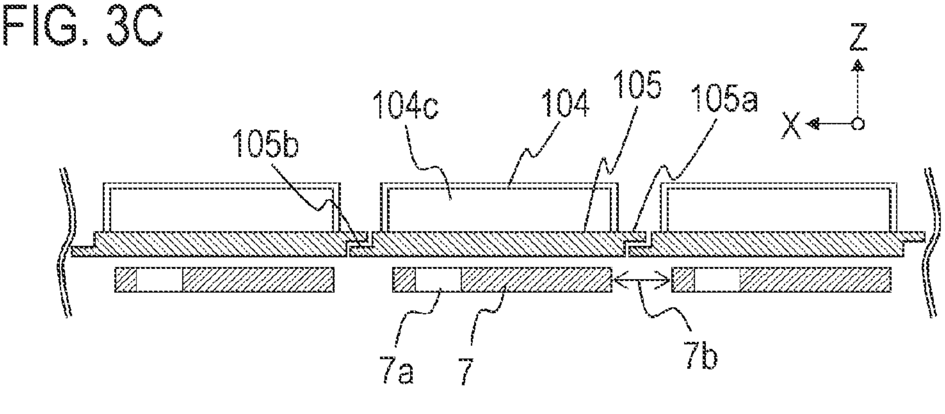

Referring to FIGS. 3A to 3C, a more detailed description will be given of a configuration around the air blowing nozzles 104 in the recording apparatus 1 in the present embodiment. FIGS. 3A to 3C are diagrams illustrating the configuration around the air blowing nozzles 104 in the recording apparatus 1 in the first embodiment of the present invention. FIG. 3A is a schematic cross-sectional view enlargedly illustrating a periphery of the air blowing nozzles 104. FIG. 3B is a schematic top view obtained by looking down the periphery of the air blowing nozzles 104 in a direction perpendicular to the conveyance direction (Y-direction) of the recording medium 2. FIG. 3C is a schematic cross-sectional view when the air blowing nozzles 104 are viewed at a position indicated by a broken line D in FIG. 3B in a direction reverse to the conveyance direction (Y-direction) of the recording medium 2.

As illustrated in FIG. 3A, in the recording apparatus 1 in the present embodiment, each of the air blowing nozzles 104 includes the blown air guide plate 105 serving as a blown air guide member. In the present embodiment, the air blowing nozzle 104 is disposed above the pinch roller holder 7, and the blown air guide plate 105 is a plate-like member serving as a partition vertically separating a space facing the blown air outlet 104*c* of the air blowing nozzle 104 and the pinch roller holder 7. The blown air guide plate 105 guides the air flowing from the blown air outlet 104*c* of the air blowing nozzle 104 toward the supported region 2*a* of the recording medium 2 which is supported by the platen 11, while restricting the air from flowing toward a side (downward) on which the pinch roller holder 7 is disposed.

The blown air guide plate 105 is provided above the pinch roller holder 7 and on a downstream side of the air blowing nozzle 104 in the air path formed by the air blowing unit 100. More specifically, the blown air guide plate 105 is fixed to a part of an opening edge of the blown air outlet 104*c* of the air blowing nozzle 104 which is proximate to the pinch roller holder 7 so as to extend continuously from the blown air outlet 104*c* toward the supported region 2*a*.

As illustrated in FIGS. 3B and 3C, the blown air guide plate 105 is placed so as to fill a hole (through hole) 7*a* present in the pinch roller holder 7 and a gap 7*b* between the pinch roller holders 7. An upper surface of the blown air guide plate 105 corresponding to a space-side surface facing the blown air outlet 104*c* is a smooth flat surface. Each of the pinch roller holders 7 may be provided not only with the through hole 7*a*, but also with, e.g., a recessed portion shape for lightening or the like, and a surface (upper surface) of the pinch roller holder 7 facing a space side facing the blown air outlet 104*c* may include various uneven shapes instead of being formed only of a planar surface. When such an uneven shape is exposed to a flow path of the air flowing from the blown air outlet 104*c*, there is a concern that a flow of the air may be disturbed, and the air may be non-uniformly applied to the supported region 2*a* of the recording medium 2. The blown air guide plate 105 serving as a partition between the pinch roller holder 7 and the flow path described above prevents the blown air generated by the air blowing fan 101 from being disturbed by the shape of the pinch roller holder 7 and allows the blown air to be uniformly applied to the ink ejected onto the recording medium 2 on the platen 11.

The blown air guide plate 105 is divided into a plurality of pieces in the width direction of the recording medium 2 along the main scanning direction to be placed. As illustrated in FIG. 3C, the divided blown air guide plate 105 is disposed such that at least one of the pieces thereof overlaps the adjacent piece of the blown air guide plate 105 in the width direction (X-direction) of the recording medium 2. An aggregate of the plurality of blown air guide plates 105 which is consecutive in the width direction of the recording medium 2 is configured so as to have a single-plate form elongated in the width direction.

In other words, each of the blown air guide plates 105 has, in a part thereof connecting to the blown air guide plate 105 adjacent thereto on one side in the width direction of the recording medium 2, a first connecting portion 105*a* extending from a space side (upper surface side) of a widthwise end surface facing the blown air outlet 104*c* in the width direction of the recording medium 2. The blown air guide plate 105 also has, in a portion thereof connecting to the blown air guide plate 105 adjacent thereto on another side in the width direction of the recording medium 2, a second connecting portion 105*b* extending from a side (lower surface side) of the widthwise end surface on which the pinch roller holder 7 is disposed in the width direction of the recording medium 2. The first connecting portion 105*a* of one of the adjacent two blown air guide plates 105 and the second connecting portion 105*b* of another of the adjacent two blown air guide plates 105 are connected so as to overlap each other when viewed in a direction (Z-direction) crossing each of the conveyance direction and the width direction of the recording medium 2. In other words, the adjacent two blown air guide plates 105 are connected so as to overlap each other in the width direction of the recording medium 2.

Thus, the plurality of blown air guide plates 105 is connected so as to have portions (overlap portions) overlapping each other between the adjacent blown air guide plates 105, and consequently it is possible to eliminate gaps between the adjacent blown air guide plats 105. As a result, it becomes possible to effectively prevent disturbance of the blown air and uniformly apply the air to a printed surface (recorded surface) of the recording medium 2 resulting from printing performed on the platen 11.

In the present embodiment, the blown air guide plate 105 is configured to be divided such that spacings between the plurality of blown air guide plates 105 substantially correspond to spacings at which the blown air outlets 104*c* of the plurality of air blowing nozzles 104 are arranged, but the blown air guide plate 105 may also be configured to be divided such that the spacings between the plurality of blown air guide plates 105 do not correspond to the spacings between the blown air outlets 104*c*. Alternatively, the blown air guide plate 105 may also be configured as a single plate undivided in the main scanning direction.

The configuration of the blown air guide member needs only to be such that a surface (guide surface) exposed to the flow path of the air flowing from the blown air outlet 104*c* of the air blowing nozzle 104 is a smooth planar surface. In other words, components other than the guide surface that guides the blown air are not limited to specific configurations and, e.g., a surface facing the pinch roller holder 7 may also be provided with an uneven shape (such as, e.g., an uneven shape corresponding to unevenness of the pinch roller holder 7). Consequently, a form of the blown air guide member is not limited to that of a plate-like member such as that of the blown air guide plate 105 in the present embodiment.

The recording apparatus according to the present embodiment is a recording apparatus including a so-called serial-type recording head that performs recording, while scanning a recording medium. However, the present invention is also applicable to a recording apparatus including a so-called line-type recording head having a plurality of ejection ports of lengths corresponding to a width of the recording medium.

Second Embodiment

In the first embodiment, the description has been given of the configuration in which the blown air guide plates 105 are integrally fixed to the air blowing nozzles 104. In the second embodiment, a description will be given of a configuration in which the blown air guide plates 105 are integrally fixed to the pinch roller holders 7. In the second embodiment, a description will be given herein mainly of points different from those in the first embodiment while, in the second embodiment, configurations common to those in the first embodiment are denoted by the same reference signs, and a description thereof is omitted. Configurations in the second embodiment which are not particularly described herein are the same as those in the first embodiment.

Figure 4A:
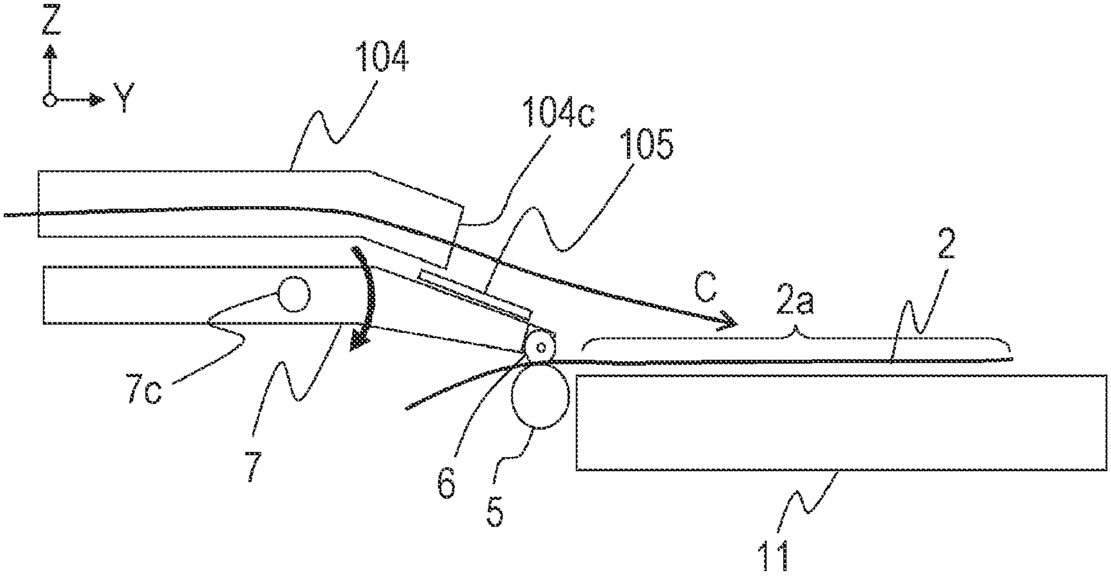
FIGS. 4A and 4B are illustrative views of a configuration around each of the air blowing nozzles of the recording apparatus in a second embodiment of the present invention.
Figure 4B:
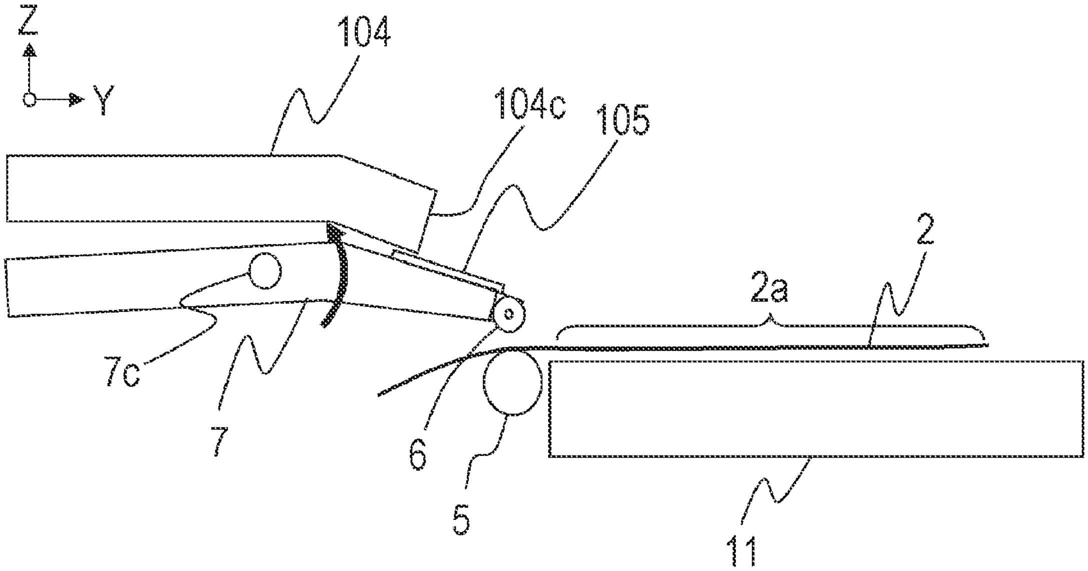

Referring to FIGS. 4A and 4B, a description will be given of a configuration around each of the air blowing nozzles 104 in the recording apparatus in the second embodiment of the present invention. FIG. 4A is a schematic cross-sectional view illustrating the configuration around the air blowing nozzle 104 in the recording apparatus according to the present embodiment, and illustrates a situation when air is blown. FIG. 4B is a schematic cross-sectional view illustrating the configuration around the air blowing nozzle 104 in the recording apparatus according to the present embodiment, and illustrates a situation when the recording medium 2 is set.

As illustrated in FIG. 4A, in the recording apparatus in the present embodiment, the blown air guide plate 105 is fixed to an upper surface of the pinch roller holder 7, i.e., the surface of the pinch roller holder 7 which faces a space facing the blown air outlet 104*c* of the air blowing nozzle 104. Accordingly, when the pinch roller holder 7 swings, as illustrated in FIG. 4B, the blown air guide plate 105 can move integrally with the pinch roller holder 7. When, e.g., the recording medium 2 is set onto the platen 11, the pinch roller holder 7 may be operated so as to form a gap between the conveying roller 5 and the pinch roller 6.

By using a configuration in which the blown air guide plate 105 is provided on the pinch roller holder 7, it is possible to bring a height of the blown air guide plate 105 closer to the platen 11. Consequently, it is possible to orient an air blowing direction C from the air blowing nozzle 104 into a direction toward the supported region 2*a* of the recording medium 2 supported on the platen 11. Therefore, it is possible to improve a drying efficiency of the ink ejected to the recording medium 2.

The blown air guide plate 105 can be disposed such that at least one portion thereof overlaps a leading end portion of the air blowing nozzle 104 provided with the blown air outlet 104*c* in the conveyance direction. In other words, the blown air guide plate 105 may be configured such that, when viewed in a direction (substantially Z-direction) perpendicular to the air blowing path, a leading-end-side portion of the air blowing nozzle 104 and the portion of the blown air guide plate 105 have portions (overlap portions) overlapping each other. This can reduce the gap between the air blowing nozzle 104 and the blown air guide plate 105 and, by reducing disturbance of the blown air, it is possible to uniformly apply the blown air to the recording medium 2 on which printing has been performed on the platen 11.

Third Embodiment

In the third embodiment of the present invention, a description will be given of another configuration example of the configuration in which the blown air guide plates 105 are integrally fixed to the pinch roller holders 7. In the third embodiment, a description will be given herein mainly of points different from those in the first and second embodiments and, in the third embodiment, configurations common to those in the first and second embodiments are denoted by the same reference signs, and a description thereof is omitted. Configurations in the third embodiment which are not particularly described herein are the same as those in the first and second embodiments.

Figure 5A:
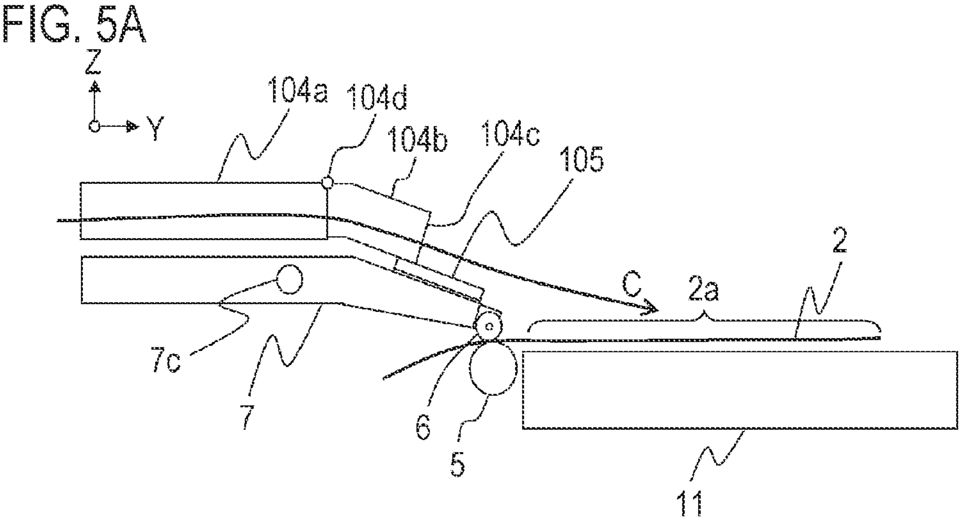
FIG. 5A to 5C are illustrative views of a configuration around each of the air blowing nozzles of the recording apparatus in a third embodiment of the present invention.
Figure 5B:
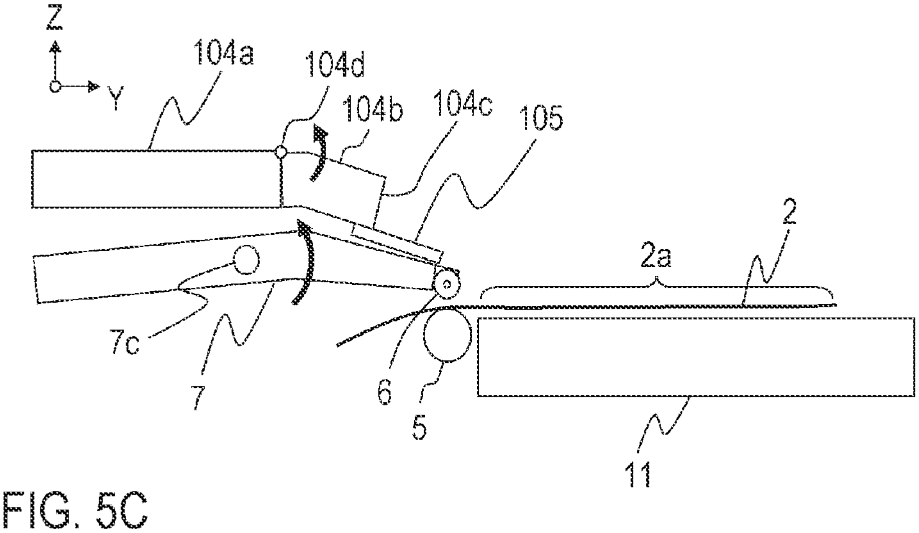
Figure 5C:
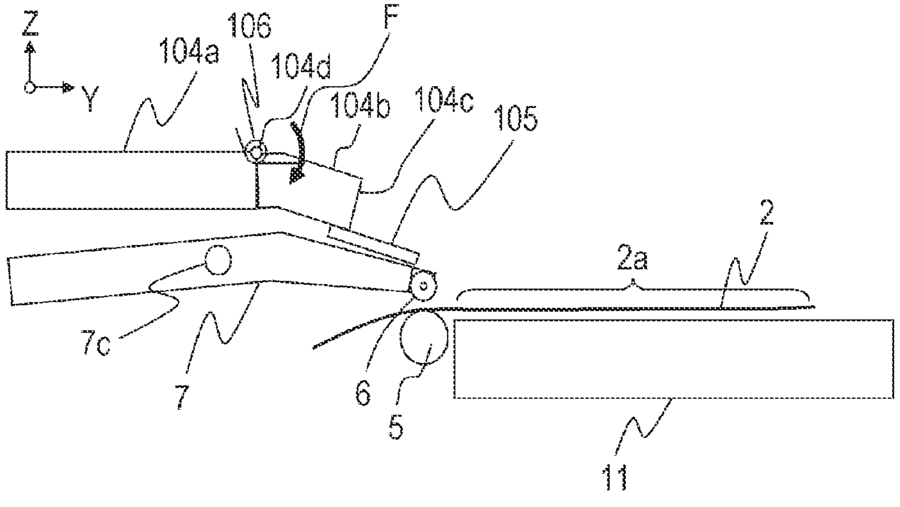

Referring to FIGS. 5A to 5C, a description will be given of a configuration around each of the air blowing nozzles 104 in the recording apparatus in the third embodiment of the present invention. FIG. 5A is a schematic cross-sectional view illustrating the configuration around the air blowing nozzle 104 in the recording apparatus according to the present embodiment, and illustrates a situation when air is blown. FIG. 5B is a schematic cross-sectional view illustrating the configuration around the air blowing nozzle 104 in the recording apparatus according to the present embodiment, and illustrates a situation when the recording medium 2 is set. FIG. 5C is a schematic cross-sectional view illustrating the configuration around the air blowing nozzle 104 in the recording apparatus according to the present embodiment, and illustrates a state where the blown air guide plate 105 is biased by a biasing member.

The air blowing unit 100 is configured to include the air blowing fan 101 serving as the blown air source, and the blown air ducts 103 and the air blowing nozzles 104 each serving as an air path member forming the air path (see FIG. 2).

As illustrated in FIG. 5A, in the present embodiment, the air blowing nozzle 104 continued to the blown air duct 103 on an air path downstream side is configured to include an air-blowing-nozzle fixed portion 104*a* serving as a fixed air path member and an air-blowing-nozzle movable portion 104*b* serving as a movable air path member. The air-blowing-nozzle fixed portion 104*a* is connected to the blown air duct 103 on the air path downstream side. The air-blowing-nozzle movable portion 104*b* is continued to the air-blowing-nozzle fixed portion 104*a* on the air path downstream side to form, integrally with the air-blowing-nozzle fixed portion 104*a*, the air path, while including the blown air outlet 104*c* on the air path downstream side. The air-blowing-nozzle movable portion 104*b* is connected to an air path downstream end of the air-blowing-nozzle fixed portion 104*a* via a rotation shaft 104*d* along the main scanning direction, and configured to be swingable around a rotation axis line along the main scanning direction with respect to the air-blowing-nozzle fixed portion 104*a*.

The blown air guide plate 105 has a rear end side corresponding to an air path upstream side which is fixed to a lower surface (surface facing the pinch roller holder 7) of the air-blowing-nozzle movable portion 104*b*. The blown air guide plate 105 also has a leading end side corresponding to the air path downstream side which extends toward the supported region 2*a* of the recording medium so as to be continued to the blown air outlet 104*c* of the air-blowing-nozzle movable portion 104*b*. The blown air guide plate 105 is fixed to the air-blowing-nozzle movable portion 104*b* such that at least one portion of a lower surface thereof can come into contact with the pinch roller holder 7.

As illustrated in FIG. 5B, when the pinch roller holder 7 swings, the air-blowing-nozzle movable portion 104*b* and the blown air guide plate 105 are allowed to move (follow and swing) with the swing of the pinch roller holder 7 due to contact between the blown air guide plate 105 and the pinch roller holder 7. When, e.g., the recording medium 2 is set on the platen 11, the pinch roller holder 7 may be operated so as to form a gap between the conveying roller 5 and the pinch roller 6.

By using a configuration in which the blown air guide plate 105 is provided on the pinch roller holder 7, it is possible to bring the height of the blown air guide plate 105 closer to the platen 11. Consequently, it is possible to orient the air blowing direction C from the air-blowing-nozzle movable portion 104*b* into the direction toward the supported region 2*a* of the recording medium 2 which is supported on the platen 11. Therefore, it is possible to improve the drying efficiency of the ink ejected to the recording medium 2.

As illustrated in FIG. 5C, the air-blowing-nozzle movable portion 104*b* and the blown air guide plate 105 may also be configured to be caused to follow the pinch roller holder 7 by a torsion coil spring 106 serving as the biasing member. In other words, in a state where the blown air guide plate 105 is in touch (contact) with the pinch roller holder 7, the torsion coil spring 106 biases the blown air guide plate 105 toward the pinch roller holder 7 such that the touching state (contact state) is maintained. A biasing force F generated by the torsion coil spring 106 allows the blown air guide plate 105 to more reliably follow the operation of the pinch roller holder 7. For example, depending on a situation in which the recording medium 2 is conveyed, such a situation can be considered in which the pinch roller 6 is instantaneously lifted to abruptly lift the pinch roller holder 7, and the resulting impact causes the blown air guide plate 105 to bounce up. In such a case, there is a concern that the blown air guide plate 105 is lifted away from the pinch roller holder 7 to collide with, e.g., the carriage 4. According to the present embodiment, the biasing by the torsion coil spring 106 inhibits the blown air guide plate 105 from being lifted away from the pinch roller holder 7, which can reduce a risk of the collision of the blown air guide plate 105 with the carriage 4.

In the example illustrated in FIG. 5C, the torsion coil spring 106 is illustrated as an example of the biasing member, but a specific configuration of the biasing means is not limited thereto, and may also be, e.g., a compression spring, a rubber member, or the like.

The configurations in the individual embodiments described above can be combined with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-021370, filed on Feb. 15, 2023, which is hereby incorporated by reference herein in its entirety.

What is claimed is:

1. A recording apparatus comprising:
- a conveying unit configured to convey a recording medium in a conveyance direction;
- a platen configured to support the recording medium conveyed by the conveying unit;
- a recording head configured to perform recording on the recording medium supported by the platen;
- a pressing unit configured to press the recording medium upstream of the platen with respect to the conveyance direction;
- an air blowing unit configured to blow air toward a supported region of the recording medium, which is supported by the platen, from an upstream side with respect to the conveyance direction; and
- a guide member configured to be fixed to the pressing unit, provide partitioning between a space facing a blown air outlet of the air blowing unit and the pressing unit, and guide the air blown by the air blowing unit.

2. The recording apparatus according to claim 1,
wherein the pressing unit includes:
- a pressing member configured to come into contact with a recorded surface of the recording medium; and
- a supporting member extending from the upstream side with respect to the conveyance direction toward the supported region to support, at a leading end side thereof, the pressing member, and wherein the guide member provides partitioning between a space facing the blown air outlet of the air blowing unit and at least the supporting member of the pressing unit.

3. The recording apparatus according to claim 2,
wherein the guide member is fixed to the supporting member.

4. The recording apparatus according to claim 2,
wherein the conveying unit has a conveying member that holds the recording medium between the conveying member and the pressing member to convey the recording medium, and
wherein the supporting member is configured to be swingable so as to bring the pressing member into contact with and away from the conveying member.

5. The recording apparatus according to claim 4,
wherein the air blowing unit includes:
- a blown air source;
- a fixed air path member configured to form an air path of the air generated by the blown air source; and
- a movable air path member configured to be continued to the fixed air path member on a downstream side of the air path, the movable air path member forming the air path together with the fixed air path member, and having the blown air outlet, and moreover being provided to be swingable with respect to the fixed air path member, wherein the guide member is fixed to the movable air path member to be able to come into contact with the supporting member of the pressing unit, and
wherein, as a result of contact between the guide member and the supporting member, the movable air path member swings by following swinging of the supporting member.

6. The recording apparatus according to claim 5, further comprising:
- a biasing member, the biasing member biasing the guide member toward the supporting member, while the guide member is in contact with the supporting member, so as to maintain a state of the contact.

7. The recording apparatus according to claim 2,
wherein a plurality of the pressing members is provided so as to be aligned in a scanning direction crossing the conveyance direction, and
wherein a plurality of the supporting members is provided to correspond to the plurality of the pressing members.

8. The recording apparatus according to claim 7,
wherein the plurality of supporting members is aligned in the scanning direction with gaps being interposed therebetween.

9. The recording apparatus according to claim 7, wherein each of the supporting members has a through hole.

10. The recording apparatus according to claim 7, wherein a plurality of the blown air outlets is provided so as to be aligned in the scanning direction.

11. The recording apparatus according to claim 10, wherein the guide member is a plate-like member.

12. The recording apparatus according to claim 7, wherein a plurality of the guide members is provided so as to be connected to each other and aligned in the scanning direction.

13. The recording apparatus according to claim 12, wherein the plurality of guide members is connected so as to have parts overlapping each other between the guide members adjacent to each other in the scanning direction.

14. The recording apparatus according to claim 1, wherein the blowing unit is disposed above the pressing unit.

15. A recording apparatus comprising:

a conveying unit configured to convey a recording medium in a conveyance direction;

a platen configured to support the recording medium conveyed by the conveying unit;

a recording head configured to perform recording onto the recording medium supported by the platen;

a pressing unit configured to press the recording medium upstream of the platen with respect to the conveyance direction;

an air blowing unit configured to blow air toward a supported region of the recording medium, which is supported by the platen, from an upstream side with respect to the conveyance direction; and a guide member fixed to the pressing unit to guide the air blown by the air blowing unit toward the supported region, while restricting the air, blown by the air blowing unit, from flowing toward the pressing unit.

16. The recording apparatus according to claim 15, wherein the pressing unit includes:

a pressing member configured to come into contact with a recorded surface of the recording medium; and a supporting member extending from the upstream side with respect to the conveyance direction toward the supported region to support, at a leading end side thereof, the pressing member, and wherein the guide member provides partitioning between a space facing the blown air outlet of the air blowing unit and at least the supporting member of the pressing unit.

17. The recording apparatus according to claim 16, wherein the guide member is fixed to the supporting member.

18. The recording apparatus according to claim 16, wherein the conveying unit has a conveying member that holds the recording medium between the conveying member and the pressing member to convey the recording medium, and wherein the supporting member is configured to be swingable so as to bring the pressing member into contact with and away from the conveying member.

19. The recording apparatus according to claim 18, wherein the air blowing unit includes:

a blown air source;

a fixed air path member configured to form an air path of the air generated by the blown air source; and a movable air path member configured to be continued to the fixed air path member on a downstream side of the air path, the movable air path member forming the air path together with the fixed air path member, and having the blown air outlet, and moreover being provided to be swingable with respect to the fixed air path member, wherein the guide member is fixed to the movable air path member to be able to come into contact with the supporting member of the pressing unit, and wherein, as a result of contact between the guide member and the supporting member, the movable air path member swings by following swinging of the supporting member.

20. The recording apparatus according to claim 19, further comprising:

a biasing member, the biasing member biasing the guide member toward the supporting member, while the guide member is in contact with the supporting member, so as to maintain a state of the contact.

* * * * *